United States Patent
Entenmann et al.

(10) Patent No.: US 9,440,537 B2
(45) Date of Patent: Sep. 13, 2016

(54) METHOD AND DEVICE FOR OPERATING FUNCTIONS DISPLAYED ON A DISPLAY UNIT OF A VEHICLE USING GESTURES WHICH ARE CARRIED OUT IN A THREE-DIMENSIONAL SPACE, AND CORRESPONDING COMPUTER PROGRAM PRODUCT

(71) Applicant: Daimler AG, Stuttgart (DE)

(72) Inventors: Volker Entenmann, Affalterbach (DE);
Stefan Mattes, Stuttgart (DE); Joerg Reisinger, Loechgau (DE); Tingting Zhang-Xu, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/371,022

(22) PCT Filed: Dec. 8, 2012

(86) PCT No.: PCT/EP2012/005081
§ 371 (c)(1),
(2) Date: Jul. 8, 2014

(87) PCT Pub. No.: WO2013/104390
PCT Pub. Date: Jul. 18, 2013

(65) Prior Publication Data
US 2014/0358368 A1    Dec. 4, 2014

(30) Foreign Application Priority Data

Jan. 9, 2012    (DE) .................. 10 2012 000 201

(51) Int. Cl.
*G06F 3/01*    (2006.01)
*G06F 3/048*    (2013.01)
*B60K 37/06*    (2006.01)

(52) U.S. Cl.
CPC .............. *B60K 37/06* (2013.01); *G06F 3/017* (2013.01); *B60K 2350/1052* (2013.01); *B60K 2350/2013* (2013.01)

(58) Field of Classification Search
USPC ............... 345/156, 157, 158; 382/104, 181; 701/36, 48, 49; 715/863
See application file for complete search history.

(56) References Cited

U.S. PATENT DOCUMENTS

2004/0215689 A1    10/2004    Dooley et al.
2005/0063564 A1    3/2005    Yamamoto et al.
(Continued)

FOREIGN PATENT DOCUMENTS

CN    1595336 A    3/2005
CN    101405177 A    4/2009
(Continued)

OTHER PUBLICATIONS

International Search Report (PCT/ISA/210) dated May 29, 2013, with English translation (Five (5) pages).
(Continued)

*Primary Examiner* — Adam Tissot
(74) *Attorney, Agent, or Firm* — Crowell & Moring LLP (57) ABSTRACT

A method to control functions displayed on a display unit of a vehicle uses gestures carried out in three-dimensional space. When a first gesture carried out in three-dimensional space is detected it is determined whether the detected first gesture is allocated to an activation of an operation of a function. If it is determined that the detected first gesture is the gesture allocated to the activation of the operation of the function, then the function is activated. Next a second gesture carried out in three-dimensional space is detected and it is determined whether the detected second gesture is a gesture allocated to the operation of the function. If it is determined that the detected second gesture is the gesture allocated to the operation of the function then the operation of the function is performed.

15 Claims, 3 Drawing Sheets

(56) References Cited

U.S. PATENT DOCUMENTS

| | | |
|---|---|---|
| 2009/0217211 A1 | 8/2009 | Hildreth et al. |
| 2009/0327977 A1 | 12/2009 | Bachfischer et al. |
| 2011/0242102 A1 | 10/2011 | Hess |
| 2012/0274549 A1 | 11/2012 | Wehling et al. |
| 2013/0066526 A1* | 3/2013 | Mondragon ............ C09G 5/00 701/48 |

FOREIGN PATENT DOCUMENTS

| | | |
|---|---|---|
| DE | 10 2004 038 965 A1 | 3/2005 |
| DE | 10 2006 037 156 A1 | 9/2007 |
| DE | 10 2009 046 376 A1 | 5/2011 |
| WO | WO 2009/045861 A1 | 4/2009 |
| WO | WO 2009/155465 A1 | 12/2009 |
| WO | WO 2011/003947 A1 | 1/2011 |

OTHER PUBLICATIONS

German language Written Opinion (PCT/ISA/237) dated May 29, 2013 (Six (6) pages).
German Office Action issued in German counterpart application No. 10 2012 000 201.7 dated Jan. 8, 2016 (Five (5) pages).
Chinese Office Action issued in Chinese counterpart application No. 201280066504.2 dated Dec. 30, 2015 (Seven (7) pages).

* cited by examiner

METHOD AND DEVICE FOR OPERATING FUNCTIONS DISPLAYED ON A DISPLAY UNIT OF A VEHICLE USING GESTURES WHICH ARE CARRIED OUT IN A THREE-DIMENSIONAL SPACE, AND CORRESPONDING COMPUTER PROGRAM PRODUCT

CROSS-REFERENCE TO RELATED APPLICATIONS

This application is related to PCT Application No. PCT/EP2012/005080, filed Dec. 8, 2012, a National Stage application of which is U.S. application Ser. No. 14/371,090 and PCT Application No. PCT/EP2012/005130, filed Dec. 12, 2012, a National Stage application of which is U.S. application Ser. No. 14/371,094.

BACKGROUND AND SUMMARY OF THE INVENTION

Exemplary embodiments of the present invention relate to a method and device to control functions displayed on a display unit of a vehicle using gestures carried out in three-dimensional space as well as a relevant computer program product.

PCT patent publication WO 2011/003947 A1 discloses a method and a device to control functions displayed on a display unit of a vehicle using gestures carried out in three-dimensional space in which it is determined whether a gesture carried out in three-dimensional space is detected or not, it is determined whether the detected gesture is a gesture allocated to an operation of a function or not and the function is operated if it is determined that the detected gesture is the gesture allocated to the operation of the function.

As it is directly determined whether a detected gesture is a gesture allocated to the operation of a function or not, a movement, for example, of a finger or a hand of a user, which is carried out in a detection region of a gesture detection device and is not intended to operate a function, can be determined erroneously as a gesture allocated to the operation of the function. Consequently, in this case, the function is carried out erroneously or unintentionally.

Exemplary embodiments of the present invention are directed to a method, a device and a relevant computer program product, which allows a gesture-based control of functions in a vehicle in a simple and reliable way.

According to a first aspect, a method to control functions displayed on a display unit of a vehicle using gestures carried out in three-dimensional space features a) a determination of whether a first gesture carried out in three-dimensional space is detected or not, b) a determination of whether the first gesture is a gesture allocated to an activation of an operation of a function or not, if it is determined that the first gesture has been detected, c) an activation of the operation of the function, if it is determined that the detected first gesture is the gesture allocated to the activation of the operation of the function, d) a determination of whether a second gesture carried out in three-dimensional space is detected or not, e) a determination of whether the detected second gesture is a gesture allocated to the operation of the function or not, if it is determined that the second gesture has been detected, and f) an operation of the function, if it is determined that the detected first gesture is the gesture allocated to the activation of the operation of the function and if it is determined that the detected second gesture is the gesture allocated to the operation of the function.

According to one embodiment, steps d) to f) are carried out directly after one another after steps a) to c) have been carried out repeatedly.

According to a further embodiment, it is determined in step b) that the detected first gesture is the gesture allocated to the activation of the operation of the function if the detected first gesture is a first predetermined gesture, which is static for a first predetermined amount of time in a first predetermined region in three-dimensional space.

According to a further embodiment, it is determined in step e) that the detected second gesture is the gesture allocated to the operation of the function if the detected second gesture is a second predetermined gesture, which is dynamic in a second predetermined region in three-dimensional space.

According to a further embodiment, in step f) a direction of the operation of the function is determined and set by a direction of an implementation of the second gesture.

According to a further embodiment, the setting of the direction of the operation of the function is sustained in the case of repeated implementation of steps d) to f) directly after one another after steps a) to c) have been carried out.

According to a further embodiment, the method g) features a determination as to whether a third gesture carried out in three-dimensional space is detected or not, h) a determination as to whether the third gesture is a gesture allocated to a resetting of the direction of the operation of the function or not, if it is determined that the third gesture has been detected, and i) a resetting of the direction of the operation of the function if it is determined that the detected third gesture is the gesture allocated to the resetting of the direction of the operation of the function.

According to a further embodiment, it is determined in step h) that the detected third gesture is the gesture allocated to the resetting of the direction of the operation of the function if it is determined that the detected third gesture is a third predetermined gesture, which is static for a third predetermined amount of time in a third predetermined region in three-dimensional space.

According to a further embodiment, in step c), a display element depicting the activation of the function is displayed on the display unit.

According to a further embodiment, the display element depicting the activation of the function is no longer displayed on the display unit after a fourth predetermined amount of time in which no gesture is detected.

According to a second aspect, a device to control functions displayed on a display unit of a vehicle using gestures carried out in three-dimensional space has equipment designed to carry out the method described above or embodiments thereof.

According to one embodiment, the device has an infra-red detection device to detect the gesture carried out in three-dimensional space.

According to a further embodiment, the infra-red detection device has several infra-red sensors, which are arranged in one or several rows.

According to a third aspect, a computer program product to control functions displayed on a display unit of a vehicle using gestures carried out in three-dimensional space is designed to carry out the method described above or the embodiments thereof directly in combination with a computer or a computer system or indirectly after carrying out a predetermined routine.

The first to third aspects and their embodiments prevent a movement, for example of a finger or a hand of a user, which is not intended to operate a function, is determined erroneously as the gesture allocated to the operation of the function, since a gesture allocated to an activation of an operation of a function, by means of which the operation of the function is activated, must be detected before a detection of the gesture allocated to the operation of the function.

The present invention is explained in more detail below by means of exemplary embodiments with reference to the enclosed drawings.

DETAILED DESCRIPTION

The description of one exemplary embodiment of the present invention occurs below.

It is to be noted that, below, it is understood that a display unit is a preferably central display of a vehicle, preferably of a motor vehicle, and a method to control functions depicted on the display unit using gestures carried out in three-dimensional space in the vehicle is carried out.

Furthermore, a gesture described below is a gesture that is carried out in three-dimensional space by a user of the vehicle by means of a hand or a finger of the user, without touching a display, such as, for example, a touch screen, or a control element, such as, for example, a touch pad.

Figure 1:
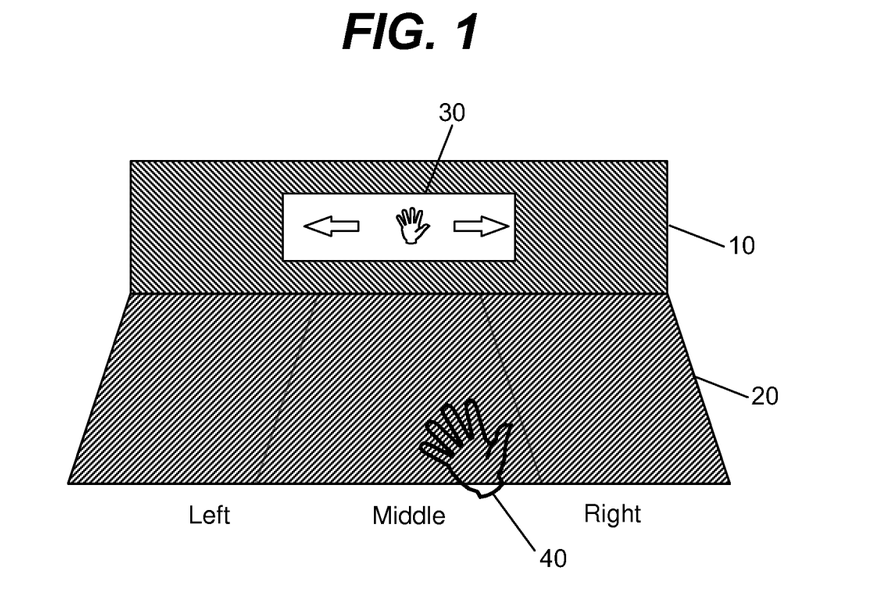
FIG. 1 a schematic depiction of a basic control concept according to an exemplary embodiment of the present invention.

FIG. 1 shows a schematic depiction of a basic control concept according to the exemplary embodiment of the present invention.

In FIG. 1, the reference numeral 10 refers to a display unit, the reference numeral 20 refers to a detection region of a detection device, the reference numeral 30 refers to a first window and the reference numeral 40 refers to a hand of the user.

The basic control concept is that a gesture operation to control functions displayed on the display unit 10 is activated by means of a first gesture in three-dimensional space carried out by a hand 40 or a finger of a user. If the first gesture is detected in the detection region 20 and is a first predetermined gesture, the first window, which displays a detection of the first predetermined gesture, is displayed on the display unit 10. The window shows possible control directions for a function to be operated.

The first predetermined gesture is a static gesture, which is static for a first predetermined amount of time in a first predetermined region in three-dimensional space. As is shown in FIG. 1, the first predetermined gesture is, for example, a static gesture, which is carried out by moving the hand 40 or the finger of the user into a part of the detection region 20 referred to by "middle" and subsequently preferably temporarily leaving the hand 40 or the finger of the user in the part of the detection region 20 referred to by "middle" for the first predetermined amount of time. Similarly, the first predetermined gesture can be a static gesture, which is carried out by moving the hand 40 or the finger of the user into a part of the detection region 20 referred to by "left" and subsequently preferably temporarily leaving the hand 40 or the finger of the user in the part of the detection region 20 referred to by "left" for the first predetermined amount of time or which is carried out by moving the hand 40 or the finger of the user into a part of the detection region 20 referred to by "right" and subsequently preferably temporarily leaving the hand 40 or the finger of the user in the part of the detection region 20 referred to by "right" for the first predetermined amount of time.

Figure 2:
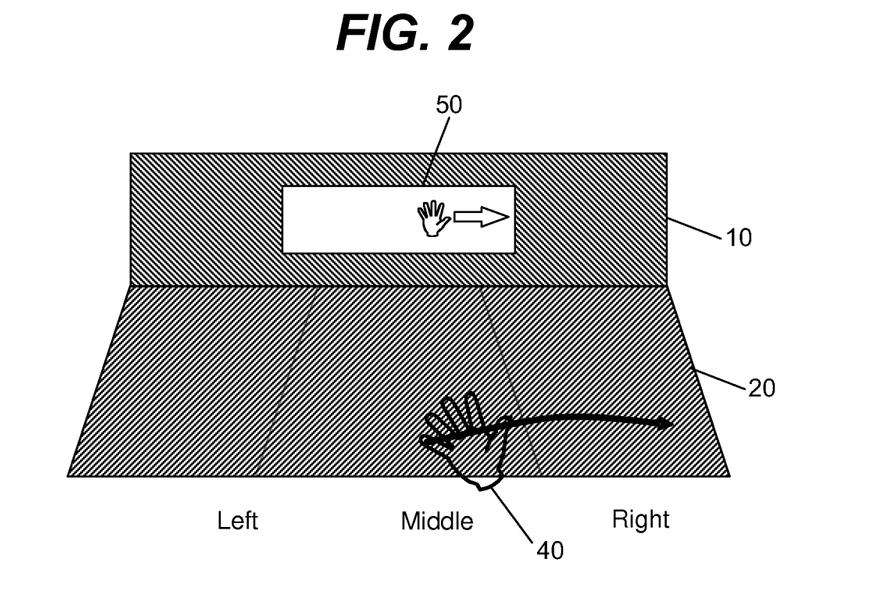
FIG. 2 a further schematic depiction of the basic control concept according to the exemplary embodiment of the present invention.

FIG. 2 shows a further schematic depiction of the basic control concept according to the exemplary embodiment of the present invention.

In FIG. 2 the same reference numerals refer to the same elements as in FIG. 1 and the reference numeral 50 refers to a second window.

If a second gesture, which is a second predetermined gesture allocated to the operation of a function, is detected for the first time after the detection of the first gesture, a control direction of the function to be operated is set depending on the second predetermined gesture and the function to be operated is operated in the set control direction.

The second predetermined gesture is a dynamic gesture, which is dynamic in a second predetermined region in three-dimensional space. As is shown by an arrow in FIG. 2, the second predetermined gesture is, for example, a dynamic gesture carried out by moving the hand 40 or the finger of the user from the part of the detection region 20 referred to by "middle" into the part of the detection region 20 referred to by "right". Similarly, the second predetermined gesture can be a dynamic gesture carried out by moving the hand 40 or the finger of the user from the part of the detection region 20 referred to by "left" into the part of the detection region 20 referred to by "middle", which is carried out by moving the hand 40; the finger of the user from the part of the detection region 20 referred to by "middle" into the part of the detection region 20 referred to by "left", which is carried out by moving the hand 40; the finger of the user from the part of the detection region 20 referred to by "right" into the part of the detection region 20 referred to by "middle", which is carried out by moving the hand 40; the finger of the user from the part of the detection region 20 referred to by "left" over the part of the detection region 20 referred to by "middle" into the part of the detection region 20 referred to by "right"; or is carried out by moving the hand 40 or the finger of the user from the part of the detection region 20 referred to by "right" over the part of the detection region 20 referred to by "middle" into the part of the detection region 20 referred to by "left"

The second predetermined gesture is a swiping movement of the hand 40 or the finger of the user. A control direction for the function to be operated is set in agreement with a direction of the first implementation of the second predetermined gesture. If, for example, in FIG. 2, the second predetermined gesture is carried out in the direction of the arrow close to the hand 40, the control direction is set in the direction which is shown by the arrow in the second window 50 in FIG. 2.

After the setting of the control direction for the function to be operated by the first detection of the second predetermined gesture, a subsequent, renewed detection of the second predetermined gesture, if necessary carried out repeatedly in rapid succession, can operate the function to be operated securely in the set control direction.

The set control direction can be reset again by a third predetermined gesture carried out in the detection region 20. Similarly to the first predetermined gesture, the third predetermined gesture can be a static gesture, which is static for a third predetermined amount of time in a third predetermined region in three-dimensional space. The predetermined first and third amounts of time of the first and third predetermined gestures can be the same as or different to each other and the predetermined first and third regions in three-dimensional space of the first and third predetermined gestures can be the same as or different from each other.

After the resetting of the control direction by the third predetermined gesture, the control direction can be set by the renewed first detection of the second predetermined gesture and the function to be operated in the set control direction can be operated securely by a subsequent, renewed detection of the second predetermined gesture, if necessary carried out repeatedly in rapid succession.

Furthermore, a display of the first window 30 or of the second window 50 ends after the occurrence of a predetermined abort criterion, such as, for example, an expiry of a fourth predetermined amount of time without the detection of a further gesture, etc.

Figure 3:
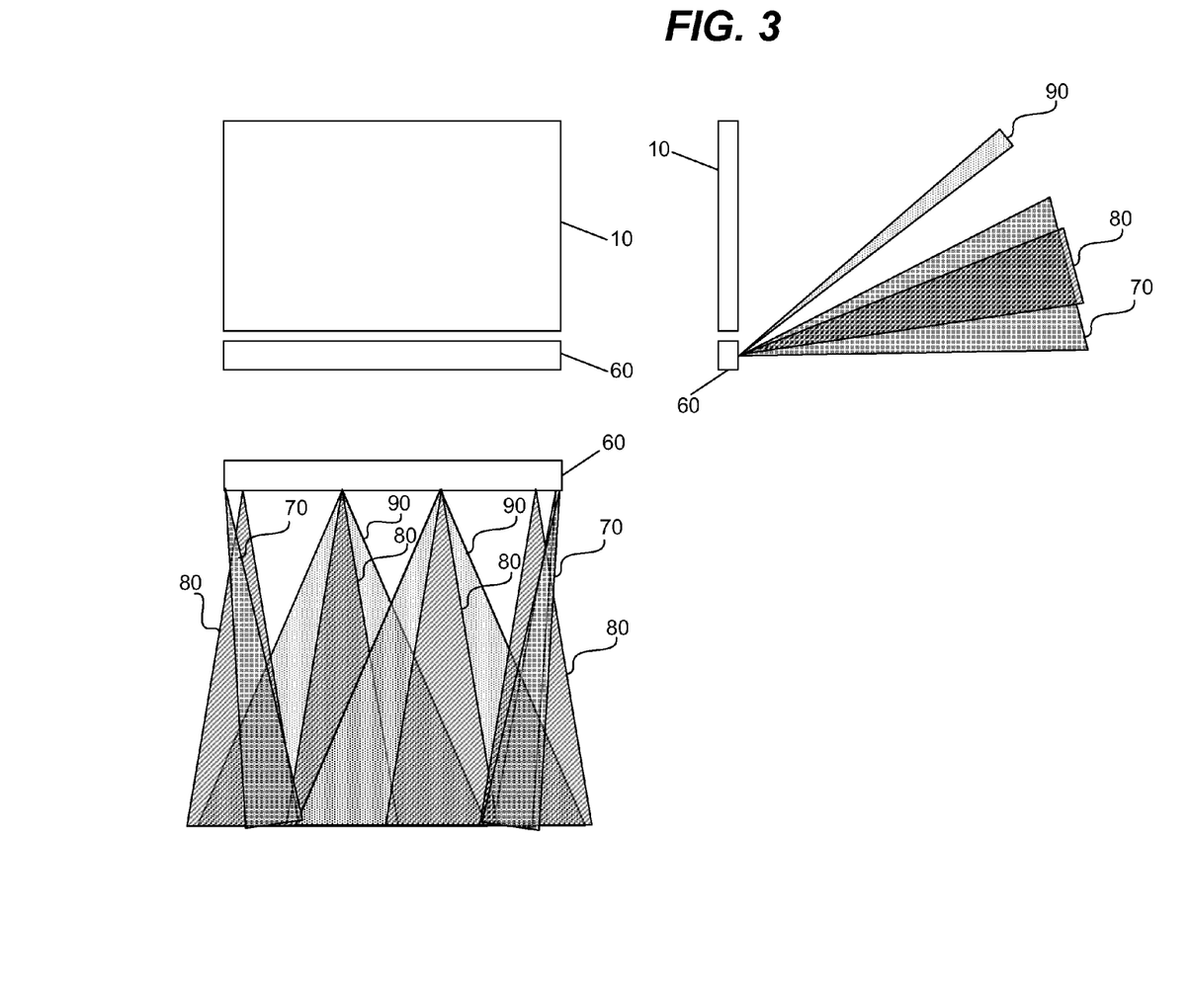
FIG. 3 a schematic depiction of a structure of a display unit and a detection device according to the exemplary embodiment of the present invention.

FIG. 3 shows a schematic depiction of a structure of a display unit and a detection device according to the exemplary embodiment of the present invention.

In FIG. 3, the reference numeral 10 refers to the display unit, the reference numeral 60 refers to a detection device, the reference numeral 70 refers to detection regions for a distinction of a control procedure by a driver or a passenger of the vehicle, the reference numeral 80 refers to a detection region for a detection of respective gestures and the reference numeral 90 refers to a detection region for a boundary of the control region.

The detection device 60 is an infra-red detection device having several infra-red sensors arranged in one or several rows, which can contactlessly detect gestures carried out in three-dimensional space.

The different detection regions 70 to 90 are set by means of the several infra-red sensors. The sensor row preferably has a height of around 6 mm and the different detection regions 70 to 90 preferably have a length of 10 to 40 cm, preferably around 30 cm. This means the infra-red sensors have a detection range of preferably 10 to 40 cm, preferably around 30 cm.

As is depicted in the top view shown in the bottom-left of FIG. 3, the detection regions 90 for a boundary of the control procedure set regions in which respective gestures can be detected as valid gestures, and the detection regions 70 set regions in which it can be distinguished as to whether a respective detected gesture is carried out by a driver or a passenger. For example, in a case of a vehicle with left-hand drive, a gesture which is carried out in the left detection region 70 is detected as a gesture carried out by the driver, whereas a gesture which passes through the right detection region 70 is detected as a gesture carried out by the passenger.

Such a distinction as to whether a gesture is carried out by a driver or by a passenger is particularly advantageous in a so-called split view display, which is able to display different pieces of information to the driver and the passenger simultaneously. Likewise, the distinction as to whether a gesture is carried out by a driver or by a passenger is advantageous with regard to an ergonomic control by the driver or the passenger.

Below, it is assumed that the detected gesture can be both a gesture carried out by the driver and a gesture carried out by the passenger.

Furthermore, as is depicted in the top view shown in the bottom-left of FIG. 3, the detection regions 80 for a detection of respective gestures set regions by means of which gestures can be detected and distinguished both statically and dynamically.

The infra-red sensors each have a transmitter and a receiver. Infra-red light is transmitted by a respective transmitter, is reflected by an object, such as, for example, a hand or a finger of a user, and is received by a respective receiver allocated to the transmitter. An output signal of a respective infra-red sensor is dependent on a distance of the reflecting object, on a size of the reflecting object and a reflectivity of a surface of the reflecting object. The infra-red sensors do not provide any clear positional or distance information about the reflecting objects, yet have the advantage that a sensor configuration is flexible and a range of the infra-red sensors is relatively large.

Significantly, an output signal of the infra-red sensors is a light barrier signal having a state of either "0" or "1", wherein one of the states "0" or "1" displays a presence of an object in the detection region of an infra-red sensor and the other state of "0" or "1" displays a non-presence of the object in the detection region of the infra-red sensor.

Gestures carried out by a hand or a finger of the user, which have been detected by the detection regions 90 for a boundary of the control region, are detected by means of the detection regions 80 for a detection of respective gestures on the basis of the basic control concept described with reference to FIGS. 1 and 2 and are carried out as a reaction to processing operations corresponding to respective gestures, such as, for example, an activation, operation, or abort.

It is to be noted that the arrangement and the number of infra-red sensors is not limited to the structure shown in FIG. 3. Furthermore, any arrangement and number of infra-red sensors can be used as long as the basic concept shown in FIGS. 1 and 2 is able to be implemented by the respective arrangement and number of infra-red sensors. It is not required that the number of detection regions be set in such a way that, as is shown in FIGS. 1 and 2, a central detection region and a left and a right detection region are present. It is sufficient if at least as many detection regions are present, such that a dynamic gesture and the direction thereof are able to be distinguished with certainty by a static gesture passing through detection regions, which is detected in at least one detection region. In the simplest case, two detection regions are sufficient.

Figure 4:
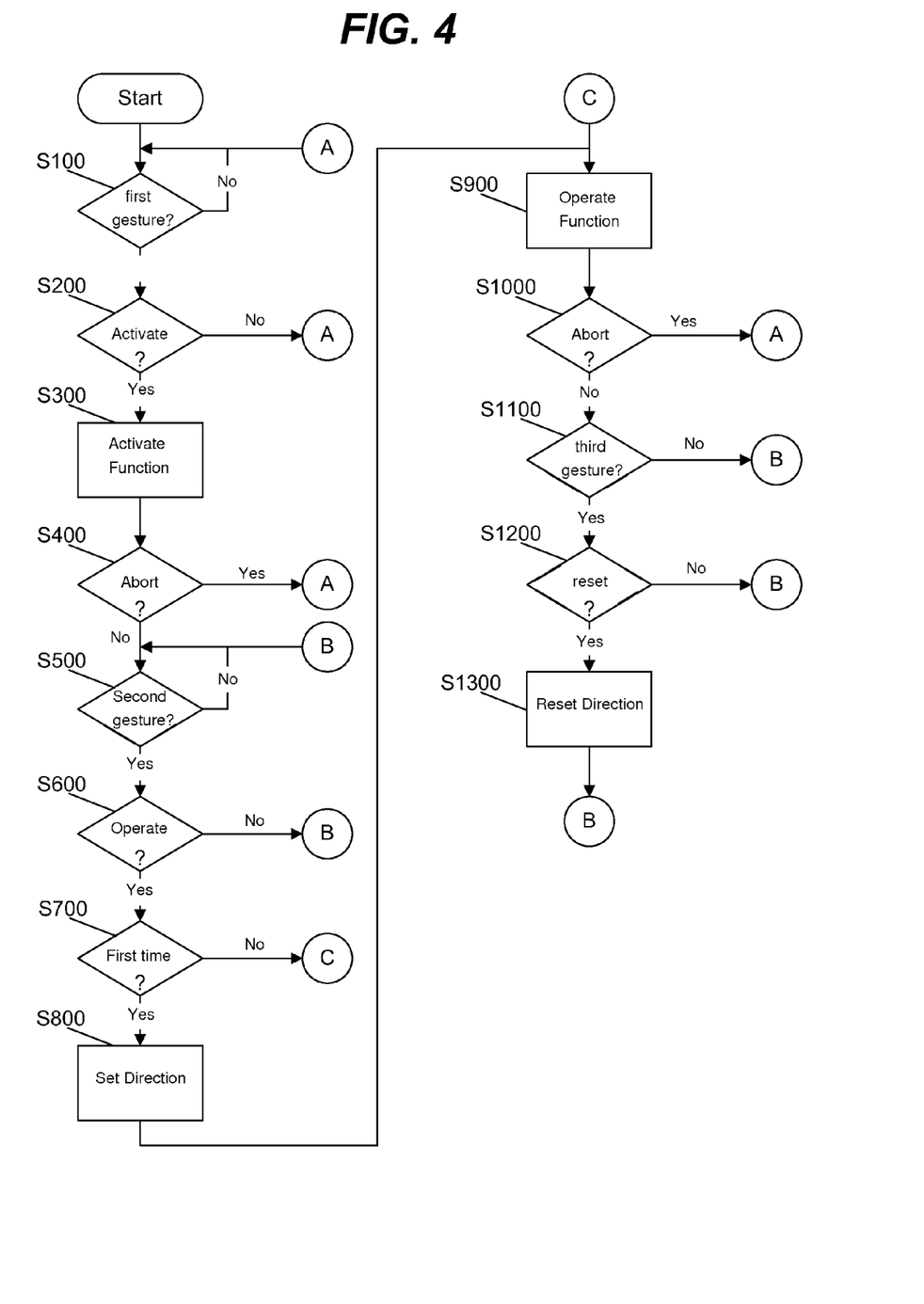
FIG. 4 a flow diagram of a method to control functions depicted on the display unit using gestures carried out in three-dimensional space according to the exemplary embodiment of the present invention.

FIG. 4 shows a flow diagram of a method to control functions depicted on the display unit using gestures carried out in three-dimensional space according to the exemplary embodiment of the present invention.

It is to be noted that a process flow of the flow diagram in FIG. 4 is switched on, for example, after an initialization point, such as, for example, after switching on an ignition of the vehicle, and is carried out in repeating cycles until an end point, such as, for example, a switching-off of the ignition of the vehicle, is reached. Alternatively, the initialization point can, for example, be the point in time of starting a motor of the vehicle and/or the end point can be the point in time of switching off the motor of the vehicle. Other initialization points and end points are likewise possible according to the present application.

Furthermore, it is to be noted that, in the case of the distinction described above between a gesture of the driver and of the passenger, the method of the flow diagram in FIG. 4 is carried out both for the driver's side and for the passenger's side. In respective steps of the flow diagram in FIG. 4, it can be determined which gesture is allocated to which side by means of the detection regions 70. In this way, the process sequence shown in FIG. 4 can be carried out expediently, for example, in parallel, in series or in a connected manner for each side.

In step S100 it is determined whether a first gesture is detected or not. If the first gesture is not detected ("No" in step S100), the process sequence returns to step S100. If the first gesture is detected ("Yes" in step S100), the process sequence advances to step S200.

In step S200, it is determined whether the detected first gesture is a gesture allocated to an activation of an operation of a function or not. If the first gesture is not a gesture allocated to the activation of the operation of the function ("No" in step S200), the process sequence returns to step S100. If the first gesture is a gesture allocated to the activation of the operation of the function ("Yes" in step S200), the process sequence advances to step S300.

The gesture allocated to the activation of the operation of the function is a first predetermined gesture, which is static for a first predetermined amount of time in a first predetermined region in three-dimensional space. The first predetermined gesture is detected, as has been described above with reference to FIGS. 1 to 3.

In step S300, the operation of the function is activated. After step S300, the process sequence advances to step S400.

During activation of the operation of the function, a display element, which displays the activation of the function, is displayed on the display unit, such as, for example, is shown in FIG. 1.

In step S400, it is determined whether a predetermined abort condition is fulfilled or not. If the predetermined abort condition is fulfilled ("Yes" in step S400), the process sequence returns to step S100. If the abort condition is not fulfilled ("No" in step S400), the process sequence advances to step S500.

The predetermined abort condition can, for example, be that no gesture has been detected for a fourth predetermined amount of time. If the predetermined abort condition in step S400 is fulfilled, the display element depicting the activation of the function is no longer displayed on the display unit.

In step S500, it is determined whether a second gesture is detected or not. If the second gesture is not detected ("No" in step S500), the process sequence returns to step S500. If the second gesture is detected ("Yes" in step S500), the process sequence advances to step S600.

In step S600, it is determined whether the detected second gesture is a gesture allocated to an operation of the function or not. If the second gesture is not a gesture allocated to the operation of the function ("No" in step S600), the process sequence returns to step S500. If the second gesture is a gesture allocated to the operation of the function ("Yes" in step S600), the process sequence advances to step S700.

The gesture allocated to the operation of the function is a second predetermined gesture, which is dynamic in a second predetermined region in three-dimensional space. The second predetermined gesture is detected, as has been described above with reference to FIGS. 1 to 3.

In step S700, it is determined whether the second predetermined gesture has been detected or not for the first time. If the second predetermined gesture has not been detected for the first time ("No" in step S700), the process sequence advances to step S900. If the second predetermined gesture has been detected for the first time ("Yes" in step S700), the process sequence advances to step S800.

In step S800, a control direction of the function to be operated is set in a direction which agrees with a direction of an implementation of the second predetermined gesture. This means that during a further implementation of second predetermined gestures, as is described below, only such second predetermined gestures are detected as valid whose direction of an implementation is in the set control direction. After step S800, the process sequence advances to step S900.

In step S900, the function is operated. After step S900, the process sequence advances to step S1000.

During the operation of the function, a display element, which displays the operation of the function, is displayed on the display unit, such as, for example, is shown in FIG. 2.

In step S1000, it is determined whether a predetermined abort condition is fulfilled or not. If the predetermined abort condition is fulfilled ("Yes" in step S1000), the process sequence returns to step S100. If the abort condition is not fulfilled ("No" in step S1000), the process sequence advances to step S1100.

The predetermined abort condition can, for example, be that no gesture has been detected for the fourth predetermined amount of time. If the predetermined abort condition in step S1000 is fulfilled, the display element depicting the operation of the function is no longer displayed on the display unit.

In step S1100, it is determined whether a third gesture is detected or not. If the third gesture is not detected ("No" in step S1100), the process sequence returns to step S500. If the third gesture is detected ("Yes" in step S1100), the process sequence advances to step S1200.

In step S1200, it is determined whether the detected third gesture is a gesture allocated to a resetting of a direction of the operation of the function or not. If the third gesture is not a gesture allocated to the resetting of the direction of the operation of the function ("No" in step S1200), the process sequence returns to step S500. If the third gesture is a gesture allocated to the resetting of the direction of the operation of the function ("Yes" in step S1200), the process sequence advances to step S1300.

In step S1300, the direction of the operation of the function is reset. After step S1300, the process sequence returns to step S500.

The gesture allocated to the resetting of the direction of the operation of the function is a third predetermined gesture, which is static for a third predetermined amount of time in a third predetermined region in three-dimensional space. The third predetermined gesture is detected, as has been described above with reference to FIGS. 1 to 3.

The method described above can be carried out by means of equipment, which forms a device to control functions displayed on the display unit of the vehicle. The display unit is preferably a central display of the vehicle, preferably of a motor vehicle.

One application of the exemplary embodiment described above is, for example, a control or switching back and forth of a menu, such as, for example, of a main menu, of a radio station or of a medium, such as, for example, as CD, in a central telematics unit of the vehicle by means of gestures, such as, for example, gestures carried out horizontally, i.e. hand or finger movements of the user, without touching a display, such as, for example, a touch screen, or a control element, such as, for example, a touch pad.

A learning process of the user can be supported by optical and/or aural feedback during a gesture control, whereby a blind control is enabled by the user after a learning phase of the user. The user can manually switch off such optical and/or aural feedback or such optical and/or aural feedback are switched off automatically after recognition of a correct gesture control by the user, for example for a predetermined amount of time.

Although in FIGS. 1 to 3 it is shown that respective infra-red sensors are arranged underneath a display unit, respective infra-red sensors can be arranged in other places, such as, for example, above a display unit, to the side of a display unit, in a different expedient place or expedient combinations of such places.

A simple and quick controllability is implemented by the image-based gesture control described above, which improves control comfort, control flexibility and control experience for the user.

The exemplary embodiment described above is able to be implemented as a computer program product, such as, for example, a storage medium, which is designed to carry out a method according to the exemplary embodiment above, in combination with a computer or several computers, i.e. computer systems, or other processing units. The computer program product can be designed such that the method is carried out only after the implementation of a predetermined routine, such as, for example, a set-up routine.

Although the present invention has been described above by means of an exemplary embodiment, it is to be understood that different embodiments and changes can be carried out without leaving the scope of the present invention, as is defined in the enclosed claims.

The disclosure of the drawing is exclusively referred to regarding further features and advantages of the present invention.

The invention claimed is:

1. A method to control functions displayed on a display unit of a vehicle using gestures carried out in three-dimensional space, the method comprising:
   a) determining whether a first gesture carried out in three-dimensional space is detected by a control device;
   b) determining, if it is determined that the first gesture has been detected, whether or not the detected first gesture is a gesture allocated to activation of an operation of a function displayed on the display unit of the vehicle by the control device;
   c) activating operation of the function if it is determined that the detected first gesture is the gesture allocated to the activation of the operation of the function by the control device;
   d) determining whether a second gesture carried out in three-dimensional space is detected by the control device;
   e) determining, if it is determined that the second gesture has been detected, whether or not the detected second gesture is a gesture allocated to the operation of the function displayed on the display unit of the vehicle by the control device;
   f) operating the function displayed on the display unit of the vehicle if it is determined that the detected first gesture is the gesture allocated to the activation of the operation of the function and the detected second gesture is the gesture allocated to the operation of the function by the control device; and
   g) setting a control direction for the function to be operated in agreement with a direction of a first detection of a second gesture allocated to the operation of the function, wherein the setting of the control direction is sustained if repeated implementation of steps d) to f) directly after one another after steps a) to c) have been carried out.

2. The method of claim 1, wherein after performing steps a) to c), steps d) to f) are repeatedly performed directly one after the other.

3. The method of claim 1, wherein it is determined in step b) that the detected first gesture is the gesture allocated to the activation of the operation of the function if the detected first gesture is static for a first predetermined amount of time in a first predetermined region in three-dimensional space.

4. The method of claim 1, wherein it is determined in step e) that the detected second gesture is the gesture allocated to the operation of the function if the detected second gesture is dynamic in a second predetermined region in three-dimensional space.

5. The method of claim 1, further comprising:
   h) determining whether a third gesture carried out in three-dimensional space is detected by the control device;
   i) determining, if it is determined that the third gesture has been detected, whether or not the detected third gesture is a gesture allocated to the resetting of the control direction by the control device;
   j) resetting the control direction if it is determined that the detected third gesture is the gesture allocated to the resetting of the control direction by the control device.

6. The method of claim 5, wherein it is determined in step i) that the detected third gesture is the gesture allocated to the resetting of the control direction if the detected third gesture is static for a third predetermined amount of time in a third predetermined region in three-dimensional space.

7. The method of claim 1, wherein in step c), a display element depicting the activation of the function is displayed on the display unit.

8. The method of claim 7, wherein the display element depicting the activation of the function is no longer displayed on the display unit after a fourth predetermined amount of time in which no gesture is detected.

9. A device to control functions displayed on a display unit of a vehicle using gestures carried out in three-dimensional space, wherein the device is configured to:
   a) determine whether a first gesture carried out in three-dimensional space is detected;
   b) determine, if it is determined that the first gesture has been detected, whether or not the detected first gesture is a gesture allocated to activation of an operation of a function;
   c) activate the operation of the function if it is determined that the detected first gesture is the gesture allocated to the activation of the operation of the function;
   d) determine whether a second gesture carried out in three-dimensional space is detected;
   e) determine, if it is determined that the second gesture has been detected, whether or not the detected second gesture is a gesture allocated to the operation of the function;
   f) operate the function if it is determined that the detected first gesture is the gesture allocated to the activation of the operation of the function and the detected second gesture is the gesture allocated to the operation of the function; and
   g) set a control direction for the function to be operated in agreement with a direction of a first detection of a second gesture allocated to the operation of the function and sustain the set control direction if repeated implementation of steps d) to f) directly after one another after steps a) to c) have been carried out.

10. The device of claim 9, wherein an infra-red detection device is configured to detect the gestures carried out in three-dimensional space.

11. The device of claim 10, wherein the infra-red detection device has several infra-red sensors arranged in one or more rows.

12. A non-transitory computer-readable medium to control functions displayed on a display unit of a vehicle using gestures carried out in three-dimensional space, wherein the computer-readable medium contains instructions, which when executed by a device, cause the device to:
a) determine whether a first gesture carried out in three-dimensional space is detected;
b) determine, if it is determined that the first gesture has been detected, whether or not the detected first gesture is a gesture allocated to activation of an operation of a function;
c) activate the operation of the function if it is determined that the detected first gesture is the gesture allocated to the activation of the operation of the function;
d) determine whether a second gesture carried out in three-dimensional space is detected;
e) determine, if it is determined that the second gesture has been detected, whether or not the detected second gesture is a gesture allocated to the operation of the function;
f) operate the function if it is determined that the detected first gesture is the gesture allocated to the activation of the operation of the function and the detected second gesture is the gesture allocated to the operation of the function; and
g) set a control direction for the function to be operated in agreement with a direction of a first detection of a second gesture allocated to the operation of the function and sustain the set control direction if repeated implementation of steps d) to f) directly after one another after steps a) to c) have been carried out.

13. The method of claim 1, further comprising, after the setting of the control direction, a subsequent detection of the second gesture allocated to the operation of the function in the set control direction operates the function.

14. The device of claim 9, wherein the device is further configured to, after the control direction is set, operate the function based on a subsequent detection of the second gesture allocated to the operation of the function in the set control direction.

15. The non-transitory computer-readable medium of claim 12, wherein the computer-readable medium contains instructions, which when executed by the device, further cause the device to, after the control direction is set, operate the function based on a subsequent detection of the second gesture allocated to the operation of the function in the set control direction.

* * * * *